UNITED STATES PATENT OFFICE.

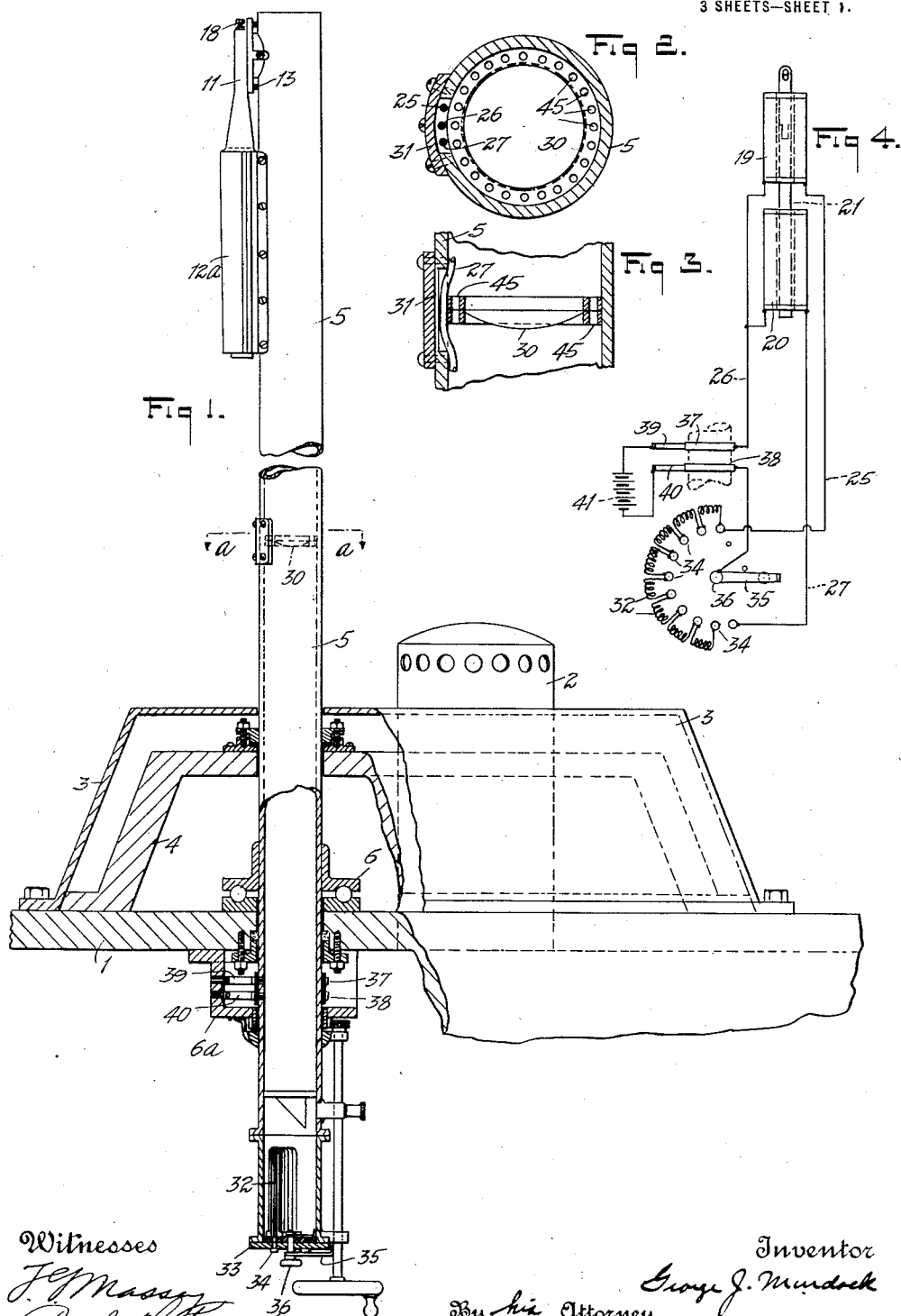

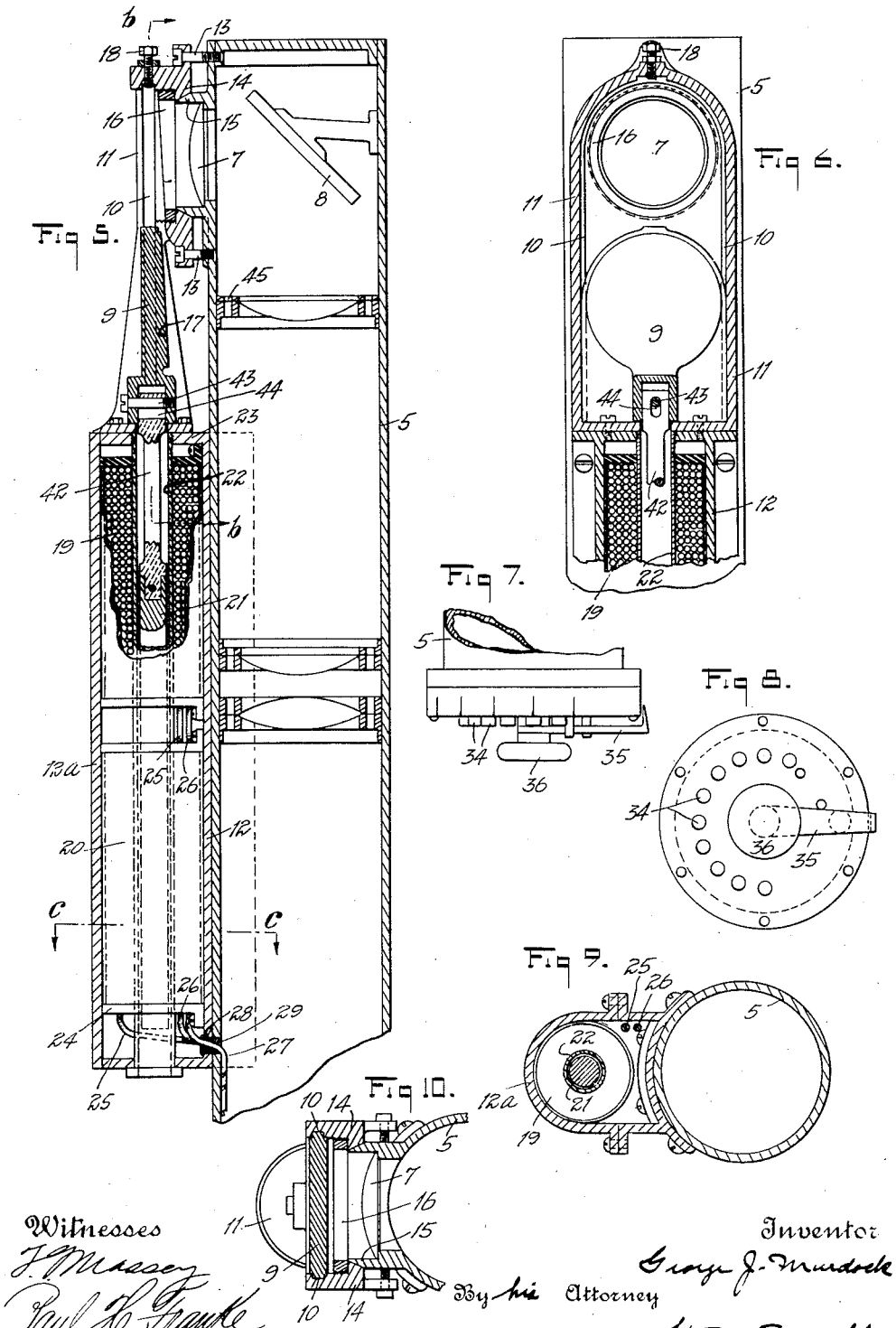

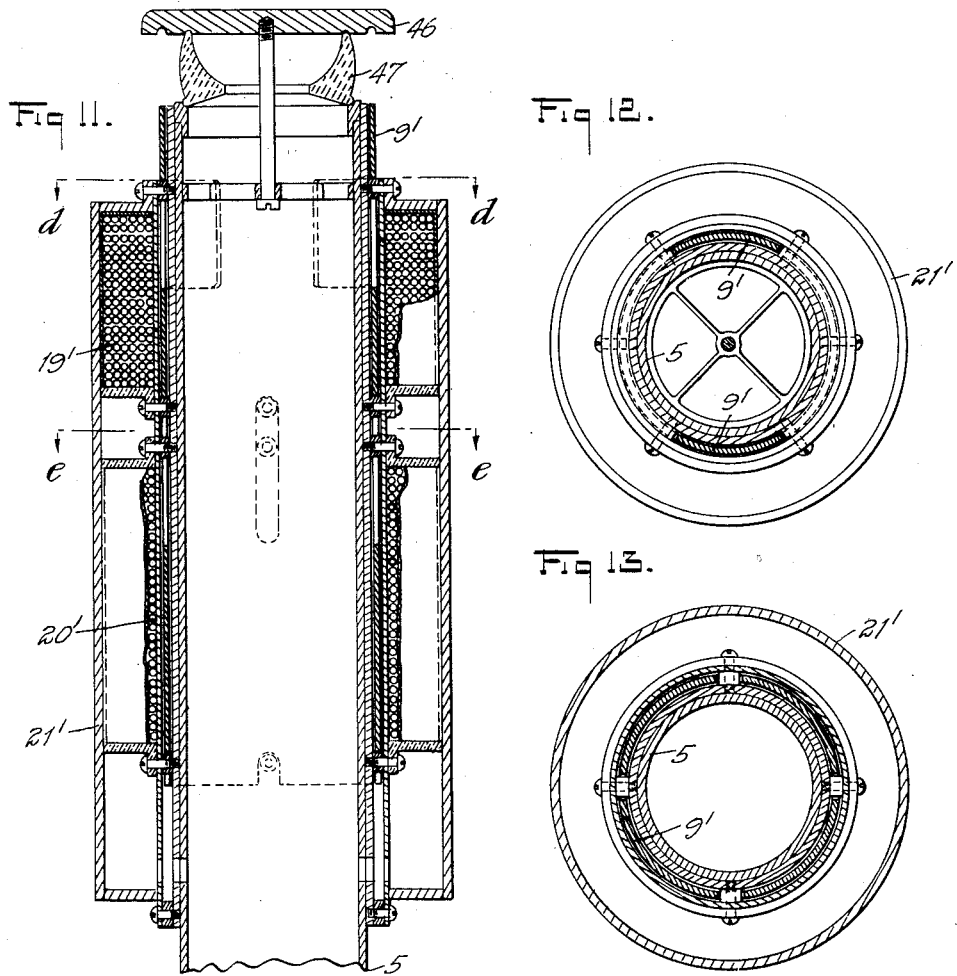

GEORGE J. MURDOCK, OF NEWARK, NEW JERSEY.

PERISCOPE.

1,275,975.   Specification of Letters Patent.   Patented Aug. 13, 1918.

Application filed January 18, 1916. Serial No. 72,843.

*To all whom it may concern:*

Be it known that I, GEORGE J. MURDOCK, a citizen of the United States of America, and a resident of Newark, in the county of Essex and State of New Jersey, have invented certain new and useful Improvements in Periscopes, of which the following is a specification.

My invention relates generally to optical apparatus comprising lenses or the like which are exposed to weather and other conditions such as may lead to the clouding or fouling of the lenses or other light-aperture members; and my invention relates particularly to periscopes, more especially to the periscopes of submarines. I will describe my invention herein with particular reference to the periscopes of submarines, but it will be understood that in so doing I do not intend to limit my invention to use in connection with that particular type of periscopes only.

As is well known, the ordinary submarine periscope consists of a tube projecting upwardly from the hull of the vessel and carrying at or near its top a lens through which the surroundings of the vessel may be viewed by means of suitable reflectors and other optical means within, or in connection with, the said periscope tube. As ordinarily constructed, the said upper lens of the periscope is exposed to spray, sleet, rain, etc., and, particularly in cold weather, may become covered with ice. Also, it sometimes happens, that when the submarine is rising after submersion, the periscope emerges through a layer of oil or other fouling substance on the surface of the water, and thereby becomes fouled. A submarine with its periscope so fouled, is practically blind; and the periscope lens can only be cleaned by sending a man to the top of the periscope after the vessel has been brought completely to the surface; and when the vessel is in a heavy sea, or when exposed to the fire of the enemy, it is practically impossible to send a man to the top of the periscope; particularly if the deck of the vessel, and the periscope tube, are covered with oil and consequently are very slippery.

Furthermore, as ordinarily constructed, moisture carried by the air within the periscope tube is apt to condense on the surfaces of the reflectors, lenses, etc., within such tube. I am informed that attempts have been made to overcome this difficulty by subjecting the air within the tube to the influence of moisture absorbing material, such as calcium chlorid; but according to my information this has not proved successful since in time, the lenses, reflectors, etc., within the periscope tube become clouded by a deposit derived from the drying material employed.

My invention comprises a shutter arrangement, controllable from within the submarine, whereby the external lens or other optical aperture of a periscope may be closed and protected normally, but nevertheless may be exposed whenever desired; also means, associated with such shutter-operating means, whereby the air, and the structural portions of the periscope, may be heated so as to avoid condensation of moisture; and other features hereinafter described and particularly pointed out in the appended claims.

The objects of my invention are to avoid the clouding or fouling of the lenses, reflectors and other optical parts of periscopes and other optical apparatus; to avoid condensation of moisture from the air within the tube of the periscope or other optical apparatus, upon the optical parts of such apparatus; and to accomplish such objects by simple, substantial, and positively-operating means.

I will now proceed to describe my invention with reference to the accompanying drawings, and will then point out the novel features in claims.

In said drawings:

Figure 1 shows, more or less diagrammatically, a fragmentary vertical longitudinal section and partial side elevation of a portion of a submarine and of a periscope tube thereon, and provided with my shutter apparatus, the upper portion of the periscope tube being shown in elevation.

Fig. 2 shows a horizontal section of the periscope tube, on the line *a—a* of Fig. 1.

Fig. 3 shows a fragmentary vertical section of the periscope tube in the immediate vicinity of the line *a—a* of Fig. 1.

Fig. 4 shows diagrammatically one arrangement of circuits for the apparatus.

Fig. 5 shows a central vertical section of the upper portion of the periscope tube and also shows, partly in section and partly in central vertical section, the solenoid motor for operating the shutter.

Fig. 6 shows a fragmentary vertical section on the line *b—b* of Fig. 5.

Fig. 7 shows a side elevation of the lower portion of the periscope tube, and shows particularly the switch mechanism for regulating the action of the solenoid motor and for regulating the heating effect of the electric heater.

Fig. 8 shows a bottom view of the periscope tube.

Fig. 9 shows a transverse section of the periscope tube and motor casing on line c—c of Fig. 5.

Fig. 10 shows a fragmentary horizontal section on the axis of the lens hood 14, and shows particularly the guide grooves in which the shutter moves.

Fig. 11 shows a central vertical section of the upper portion of a periscope affording an all-around view, and of the shutter mechanism and solenoid motor for use with that type of periscope.

Fig. 12 shows a transverse section on the line d—d of Fig. 11.

Fig. 13 shows a transverse section on the line e—e of Fig. 11.

In the drawings, 1 designates the deck of the submarine, 2 the usual conning tower, 3 the usual cut water, and 4 the usual armor structure provided in the vicinity of the conning tower. 5 designates the usual periscope tube having, in this case, a step bearing 6 and a guide bearing 6ª, the latter within the hull of the vessel; the periscope being of the type the entire periscope tube of which is rotatable. However, I do not limit myself to any of the details of construction of the periscope itself, or of its mounting; and in so far as such details are shown they are to be understood to be diagrammatic only.

Referring now to Figs. 5 and 6, 7 designates the upper lens of the periscope, and 8 the reflector employed therewith for reflecting downward through the tube 5 the pencil of light derived from said lens 7. It is this lens in particular which is likely to become ice coated, or fouled externally, as previously described.

9 designates a shutter movable in guide slots 10 in a frame member 11 secured to the top of the motor casing 12 and also secured, as by bolts 13, to the upper portion of the periscope tube. This frame member 11 comprises a hood 14 closely fitting the annular ring 15 surrounding the lens 7; the construction being such that a water-tight and, practically, air-tight joint, is formed between the said hood 14 and ring 15.

A seat ring 16, having a slightly beveled front face, is located within the hood 14, and surrounding the front edge of the lens ring 15; and the sliding shutter, 9, is provided with a beveled rear face 17 adapted to contact with the beveled front face of the seating ring 16, and thereby to form a tight joint therewith. An adjustable stop screw 18 is located to limit the upward movement of the shutter. It will be apparent that when the shutter 9 is raised so that its rear face 17 seats against the ring 16, a tight joint will be formed, preventing the entry of moisture, or moisture laden air, to the exterior surface of the lens 7; but that when the shutter is lowered the lens 7 is exposed for use of the periscope.

For raising and lowering the shutter I have shown a solenoid motor comprising an elevating solenoid coil 19, a lowering solenoid coil 20, and a plunger or armature 21 for said coils. The coils are mounted upon a tube 22, preferably of non-magnetic material which is also substantially unaffected by air and sea water; this tube being connected tightly to the upper and lower heads 23 and 24 respectively, of the solenoid case 12; the construction being such that water can circulate freely through the interior of the tube 22 without reaching the solenoid coils. The front section 12ª of the motor case 12 is removable so that, when necessary, access may be obtained to the motor itself.

As indicated particularly in Fig. 9, the wires 25 and 26 leading from the coil of the upper solenoid 19 are led down through the solenoid case 12 to the space in said case 12 beneath the lower solenoid 20, where the wire 26 is connected to one of the terminals of the lower solenoid 20, (see Fig. 4), the other terminal of that solenoid being connected to a wire 27, the three wires 25, 26 and 27 being thence led through registering openings 28 and 29 in the back of the case 12 in the side of the periscope tube, respectively, and thence are led through the interior of that periscope tube, to near the bottom thereof. Openings 28 and 29 are tightly sealed to prevent entrance of moisture, as indicated. Usually, one or more lenses, such for example as the lens 30, (Fig. 1) are provided in the periscope tube, and in such case the lens mounting is provided with a notch or aperture as indicated in Fig. 3, for the passage of the wires past such lens. In Fig. 3 and also in Fig. 1, I have indicated that at such points there may be an opening in the side of the periscope tube, such opening normally closed tightly by a cover plate 31; thereby access may be obtained to the wiring when desired.

At a convenient point, for example, at the bottom of the periscope tube, I provide suitable switch mechanism for controlling the solenoids; the control means usually comprising an adjustable rheostat whereby the action of the solenoid motor may be regulated. Since, as before mentioned, and as hereinafter explained more fully, it is desirable to heat the air in the periscope tube, I preferably locate the resistance of the rheostat motor within the periscope tube itself. In Fig. 1, 32 designates one such resistance, having the form of an ordinary resistance-grid loop.

In the bottom plate 33 of the periscope tube there may be a plurality of rheostat-buttons 34, also shown in Figs. 7 and 8, and in the diagram, Fig. 4; and in connection with these contact buttons there may be a rotatable contact arm 35, adapted to make contact with several rheostat buttons 34 successively; such contact arm being rotatable by means of a buttom 36. As indicated in Fig. 4, the various resistance loops of the rheostat are connected to successive buttons 34, and it will be clear that by adjustment of the arm 35, more or less resistance may be included in circuit at will.

Since the particular periscope shown in Fig. 1 is of the rotatable tube type, I provide the periscope tube, near its lower end, with contact rings 37 and 38, insulated from the tube itself, and provide suitable brushes 39 and 40, or their equivalents, for transmitting current to these rings 37 and 38.

A suitable source of electric energy 41, illustrated in Fig. 4 as a battery, is connected to the brushes 39 and 40. In practice these brushes will usually be connected to the so-called "auxiliary circuit" of the submarine—a circuit which usually derives current from the main storage battery through suitable resistance. As shown in Fig. 4 the common return wire 26 of the two solenoid coils may be connected to one of the rings 37 and 38, the other ring being connected to the switch arm 35; while conductor 25 is connected to one end of the rheostat and conductor 27 to the other end thereof. It will be apparent that with these circuits the operator can energize either of the solenoid coils at will, and to such extent as may seem desirable.

With the switch arm 35 in the position shown in Fig. 4, neither solenoid coil is energized. With the switch arm in this position, the shutter will, in general, be down; i. e., the periscope lens 7 will be exposed. Suppose it be desired to raise the shutter. By swinging the switch arm 35 into contact with the lowermost button 34, this button not being connected to the resistances of the rheostat, but being connected by a wire 27 to solenoid coil 20, a circuit is established through solenoid coil 20, but as the shutter is now down no movement of the shutter results. If the contact arm 35 be moved on to the next button of the rheostat, the upper solenoid coil 19 will be energized, but with the entire resistance of the rheostat in circuit. In general this resistance will be such that upward movement of the shutter will not result until, the switch arm 35 being moved farther, a portion at least of the resistance of the rheostat is cut out. As movement of the contact arm 35 is continued, the resistance will be decreased until coil 19 attains sufficient power to raise the shutter, at first slowly and then more rapidly, as the movement of the contact arm of the rheostat continues. In this way the shutter may be closed with the full power of the current but without the violent action that would occur if circuit were closed in the first instance through solenoid coil 19 without the interposition of the resistance.

After the shutter has been closed in the manner described, the contact arm 35 will, in general, be turned backward, until a very considerable resistance has been included in the circuit of solenoid coil 19; for, once the shutter has been closed, a relatively small action of the solenoid 19 is all that is required to hold the shutter closed; in fact, in general the adjustment will usually be such that the contact arm can be turned backward until all or nearly all of the resistance of the rheostat is included in circuit; the flow of current through the solenoid 19, though then low, being sufficient to hold the shutter closed under any circumstances. To open the shutter, the contact arm 35 is turned back until it rests on that contact button 34 which is in circuit with the solenoid 20. The solenoid 20 is then energized with full power, the core, plunger, or armature 21 of the solenoid motor being then attracted strongly. In practice the member 42 connecting solenoid core 21 with the shutter 9 (which member 42 is preferably of non-magnetic material) is connected to the shutter 9 by means of a pin 43 working in a slot 44 of member 42. It will be apparent that, with the shutter raised, this pin will be against the bottom of the slot 44; and when solenoid coil 20 is energized as described, and moves downward, there is a short range of movement of such core without any corresponding movement of the shutter; after which, the pin 43 having reached the upper portion of the slot 44, the shutter will be drawn down with a jerk; indeed, with a more or less strong hammer action, which will bring down the shutter no matter how tightly it may have been wedged against the rim 16.

As the downward motion of the solenoid core continues, its lower end passes well below the center of effort of the lower solenoid 20, and therefore the pull on the core decreases as that core descends. However, owing to the simple and rugged character of the mechanism, no elaborate provision of cushioning means is necessary; and indeed it is desirable that the upward action of the solenoid motor shall be quite positive, so that closing of the shutter may be assured; while on the other hand it is quite desirable that the solenoid motor shall be able to exercise a considerable jerk when lowering the shutter, so that that shutter may be lowered, even though the exposed portions of the shutter and the hood 11 be covered with ice.

I have explained previously that I heat the air within the periscope tube to prevent condensation of the moisture. It is for this reason that the rheostat coils 32 are located within the lower end of the periscope tube. The electrical energy of current passing through one or more of these coils 32 is, of course, converted into heat, and so the air around those coils is heated. As indicated particularly in Figs. 2 and 3, all lens mountings within the tube are provided with perforations 45 which permit the air heated in the lower portion of the periscope tube to rise. Since the heating of the air increases its power for carrying moisture, condensation of the moisture from such air is thereby avoided. The contact arm 35 may be extended as indicated in Fig. 7 to form a pointer, and at its lower end the periscope tube may be provided with graduations or other indicators showing different degrees of resistance included in the circuit. Tendency to condensation is of course greatest when the submarine is running submerged; at which time the shutter will ordinarily be closed; and the operator may therefore include greater or less resistance in the circuit at such times as may be required to prevent condensation within the tube. In this way enough heat may be developed to melt off any ice which may have frozen on the top of the periscope. Not only is the heat developed in the rheostat available for the melting off of ice and also for the keeping of air within the tube at a temperature such that moisture will not condense therefrom, but also the heat developed within the solenoid coils; this is particularly true of the upper solenoid, when that solenoid is energized to hold the shutter closed, and when considerable current is passing through the said coils. The heat thus developed in the solenoids is communicated directly to the metal of the upper portion of the periscope tube, thus aiding considerably in the melting off of the ice.

As appears particularly from Fig. 9, the solenoid casing is formed to fit the periscope tube very closely, and is secured rigidly thereto. This casing I preferably form of monel metal, a metal which is affected very little by sea water. The heads of the solenoids are preferably of bronze, while the tube 22 carrying the solenoid coils is preferably of copper as already stated. All joints are water tight. The frame member 11 secured to the top of the solenoid casing and provided with guides for the shutter 9, is also preferably of monel metal, as is the seating ring 16.

To prevent oxidation or corrosion of the solenoid core 21 by the action of sea water, etc., I preferably plate this core with gold—a metal which is very little affected by sea water, damp air, etc.

It will be noted that the shutter, shutter guides and associated parts, including the solenoid casing, do not add to the width of the periscope tube, as seen from the front, and add very little to the width of that tube as seen from the sides, so that, practically speaking, the visibility of the periscope is not increased materially by my invention.

I do not limit myself to the particular construction of the solenoid motor illustrated, or to the particular location of that motor illustrated, or, in fact, to any of the details of construction illustrated. The construction of the device may be varied very greatly without departing from my invention, for example, in Figs. 11, 12 and 13 I show a device, embodying my invention, and adaptable for periscopes affording an all around view. In this construction, the solenoid coils, designated respectively by numerals 19' and 20', surround the periscope tube, and the solenoid core 21' is a sleeve also surrounding the periscope. The shutter 9' is also a sleeve, coacting with a head 46 covering the combined lens and reflector 47. The operation of this device shown in Figs. 11, 12 and 13 is apparent from the previous description.

What I claim is:—

1. A protecting device for periscopes having a light opening, comprising a shutter movable across such opening and when across the same covering and protecting said opening, in combination with motor means arranged at will to move such shutter over such light opening and to hold the same there or to retract the shutter so as to expose such light opening, such motor means comprising controlling means adapted for location in, and operation from within, a vessel or other inclosure to which the periscope may be fitted.

2. The combination with a periscope having a lens to be protected, of a shutter mounted to be moved so as to inclose such lens, or, at will, to be moved so as to leave that lens exposed, in combination with motor means for so moving said shutter, such motor means comprising controlling means adapted for location in, and operation from within, a vessel or other inclosure to which the periscope may be fitted.

3. The combination with a periscope having a light aperture, of a shutter arranged to move across such aperture or away therefrom at will and when across such aperture arranged to close the aperture securely, and motor means arranged to move such shutter, such motor means comprising controlling means adapted for location in, and operation from within, a vessel or other inclosure to which the periscope may be fitted.

4. The combination with a periscope having a light aperture, of a shutter arranged to move across such aperture or away therefrom at will and when across such aperture arranged to close the aperture securely, and an electric solenoid motor arranged to operate said shutter, such motor comprising controlling means adapted for location in, and operation from within, a vessel or other inclosure to which the periscope may be fitted.

5. The combination with a periscope having a light aperture, of a shutter arranged to move across such aperture or away therefrom at will and when across such aperture arranged to close the aperture securely, motor means arranged to operate said shutter and a water tight inclosure for said motor means, such motor means comprising controlling means adapted for location in, and operation from within, a vessel or other inclosure to which the periscope may be fitted.

6. The combination with a periscope having a light aperture, of an inclosure for such light aperture comprising a shutter guide, a shutter arranged to move in such guide and in one position to close such light aperture tightly, and means for operating such shutter, such shutter operating means comprising controlling means adapted for location in, and operation from within, a vessel or other inclosure to which the periscope may be fitted.

7. The combination with a periscope having a light aperture, of an inclosure for such light aperture comprising guides for a shutter and a seating ring, a shutter arranged to move in said guides across such light aperture, and in one position to seat against such seating ring and thereby to close such light aperture securely, and means for operating said shutter.

8. The combination with a periscope having a light aperture and having a ring surrounding such aperture, of a hood securely seated on such ring, and a shutter movable in said hood and arranged in one position to tightly close such light aperture, and means for operating said shutter.

9. The combination with a periscope having a light aperture and a ring surrounding said aperture, of a hood securely seated on said ring, a beveled seating ring within said hood, and a sliding shutter beveled on one face and adapted in one position to tightly close such aperture, the beveled face of the shutter then substantially contacting with the beveled face of said seating ring.

10. The combination with a periscope having a light aperture, of an inclosure for such light aperture comprising a seating ring beveled on one face, a sliding shutter movable across the light aperture and in one position closing the same and having a beveled face, which, in the closing position, substantially contacts with the beveled face of said seating ring, and means for operating said shutter.

11. The combination with a periscope having a light aperture, of an inclosure for such light aperture comprising a sliding shutter which in one position closes such light aperture tightly, and means for operating said shutter comprising motor means having controlling means adapted for location in, and for operation from within, a vessel or other inclosure to which the periscope may be fitted.

12. The combination with a periscope having a light aperture, of an inclosure for such light aperture comprising a shutter which in one position closes such light aperture tightly, and means for operating said shutter comprising motor means having a loose connection with the shutter, whereby in opening the shutter motion is communicated to the shutter with a jerk.

13. The combination with a periscope having a light aperture, of a shutter arranged at will to close or open such aperture, electrically controlled motor means for operating such shutter, and controlling means therefor comprising electrical resistance arranged to heat the interior of the periscope.

14. The combination with a periscope having a light aperture, of a shutter arranged at will to close or open such aperture, electrically controlled means for operating such shutter, and controlling means therefor comprising a rheostat having resistance within the periscope and arranged to heat the air therein and having also contacts exterior to the periscope for adjusting the resistance.

15. The combination with a periscope having a light aperture, of a shutter arranged at will to close or open such aperture, a solenoid motor connected to the shutter to operate the same and comprising separate closing and opening coils, and a rheostat comprising resistance in circuit with the closing coil, and contact means whereby either coil may be energized and whereby more or less resistance may be included in the circuit of the closing coil, such resistance located in heating relation to the periscope, whereby by variation of the resistance in circuit the effective heating of the periscope may be regulated.

16. The combination with a periscope having a light aperture, of a shutter arranged at will to close or open such aperture, a solenoid motor connected to the shutter to operate the same and comprising separate closing and opening coils, and a rheostat comprising resistance in circuit with the closing coil and contact means whereby either coil may be energized and whereby more or less resistance may be included in the circuit of the closing coil, said solenoid motor being in heating relation with the periscope, whereby heat generated in said solenoid motor is transmitted to the periscope.

17. The combination with a periscope having a perforate lens mounting permitting air heated in the lower part of that periscope to rise to the upper portion of the periscope, of heating resistance located in heating relation to the lower portion of the periscope and means for regulating the action of such heating resistance.

In testimony whereof I have signed this specification in the presence of two subscribing witnesses.

GEORGE J. MURDOCK.

Witnesses:
JAMES J. GIBB,
JEANNETTE P. MURDOCK.